(12) United States Patent
Ota

(10) Patent No.: US 10,321,053 B2
(45) Date of Patent: Jun. 11, 2019

(54) INFORMATION PROCESSING APPARATUS AND CONTROL METHOD FOR READING OUT INFORMATION RECORDED IN ASSOCIATION WITH AN IMAGE

(71) Applicant: CANON KABUSHIKI KAISHA, Tokyo (JP)

(72) Inventor: Tomohiro Ota, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 174 days.

(21) Appl. No.: 15/260,085

(22) Filed: Sep. 8, 2016

(65) Prior Publication Data
US 2017/0078566 A1 Mar. 16, 2017

(30) Foreign Application Priority Data
Sep. 16, 2015 (JP) .................... 2015-182991

(51) Int. Cl.
*H04N 5/232* (2006.01)
*H04N 5/262* (2006.01)

(52) U.S. Cl.
CPC ....... *H04N 5/23229* (2013.01); *H04N 5/2621* (2013.01)

(58) Field of Classification Search
CPC .................. H04N 5/23229; H04N 5/2621
See application file for complete search history.

(56) References Cited

U.S. PATENT DOCUMENTS

| 9,886,931 | B2 * | 2/2018 | Webb ..................... G09G 5/02 |
| 9,967,408 | B2 * | 5/2018 | Matsuda ............ H04N 1/00114 |
| 2013/0235074 | A1 * | 9/2013 | Cherna ................... G06T 11/60 345/619 |
| 2014/0267867 | A1 * | 9/2014 | Lee ..................... H04N 5/23293 348/333.01 |
| 2015/0002537 | A1 * | 1/2015 | Samvik ................. G06T 11/60 345/620 |
| 2017/0078566 | A1 * | 3/2017 | Ota ..................... H04N 5/23229 |

FOREIGN PATENT DOCUMENTS

JP  7-212695 A  8/1995
JP  2006-211324 A  8/2006

* cited by examiner

*Primary Examiner* — Antoinette T Spinks
(74) *Attorney, Agent, or Firm* — Canon U.S.A., Inc. IP Division

(57) ABSTRACT

An information processing apparatus includes a readout unit that reads out information recorded in association with an image and that indicates an effect applied to the image, a processing unit that applies an effect to an image, and a control unit that, in a case where the information indicating the effect applied to the image has been read out, performs control to restrict the processing unit from applying to the image a part of effects including an effect other than the applied effect and being set according to the applied effect indicated by the information, from among a plurality of effects that can be applied by the processing unit.

20 Claims, 13 Drawing Sheets

INFORMATION PROCESSING APPARATUS AND CONTROL METHOD FOR READING OUT INFORMATION RECORDED IN ASSOCIATION WITH AN IMAGE

BACKGROUND

Field

Aspects of the present invention generally relate to an information processing apparatus and a control method of the same.

Description of the Related Art

There has been conventionally known an imaging apparatus that applies an effect (a special effect) to an image during shooting, and records the effect-applied image. In addition, a method has been proposed for applying an effect during reproduction or editing without applying an effect during recording. Japanese Patent Laid-Open No. 7-212695 discloses a technique of applying a special effect during reproduction by converting special effect information for performing a special effect into a video sub-code, and recording the video sub-code together with a video signal. In addition, Japanese Patent Laid-Open No. 2006-211324 discloses a technique of recording special effect control data in an auxiliary data region of an input material digital video signal.

If duplicative application of effects is performed by further applying an effect during reproduction to an image to which an effect was applied during shooting, an image defect could occur. For example, if an effect of emphasizing color saturation of an image is doubly applied during shooting and during reproduction, color information is saturated, and a resultant image can become too-sharply-outlined and awkward. In addition, if an effect of adding letter boxes (black bars) to the upper and lower parts of an image so as to make the image look like a landscape-oriented image is applied during shooting, and an image distorting effect is applied during reproduction, a resultant image can be distorted including the letter boxes.

SUMMARY OF THE INVENTION

Aspects of the present invention address the above and are generally directed to preventing a result different from a user's intention from being obtained by applying an effect to an effect-applied image.

An information processing apparatus includes a readout unit configured to read out information recorded in association with an image and that indicates an effect applied to the image, a processing unit configured to apply an effect to an image, and a control unit configured to, in a case where the information indicating the effect applied to the image has been read out, perform control to restrict the processing unit from applying to the image a part of effects including an effect other than the applied effect and being set according to the applied effect indicated by the information, from among a plurality of effects that can be applied by the processing unit.

Further features and aspects of the present invention will become apparent from the following description of exemplary embodiments (with reference to the attached drawings).

DESCRIPTION OF THE EMBODIMENTS

An exemplary embodiment of the present invention will be described in detail below with reference to the accompanying drawings.

The following exemplary embodiment is merely one example for implementing aspects of the present invention and can be appropriately modified or changed depending on individual constructions and various conditions of apparatuses to which aspects of the present invention are applied. Thus, the aspects of the present invention are in no way limited to the following exemplary embodiment.

Exemplary embodiments of the present invention will be described below based on the drawings.

First Exemplary Embodiment

Figure 1:
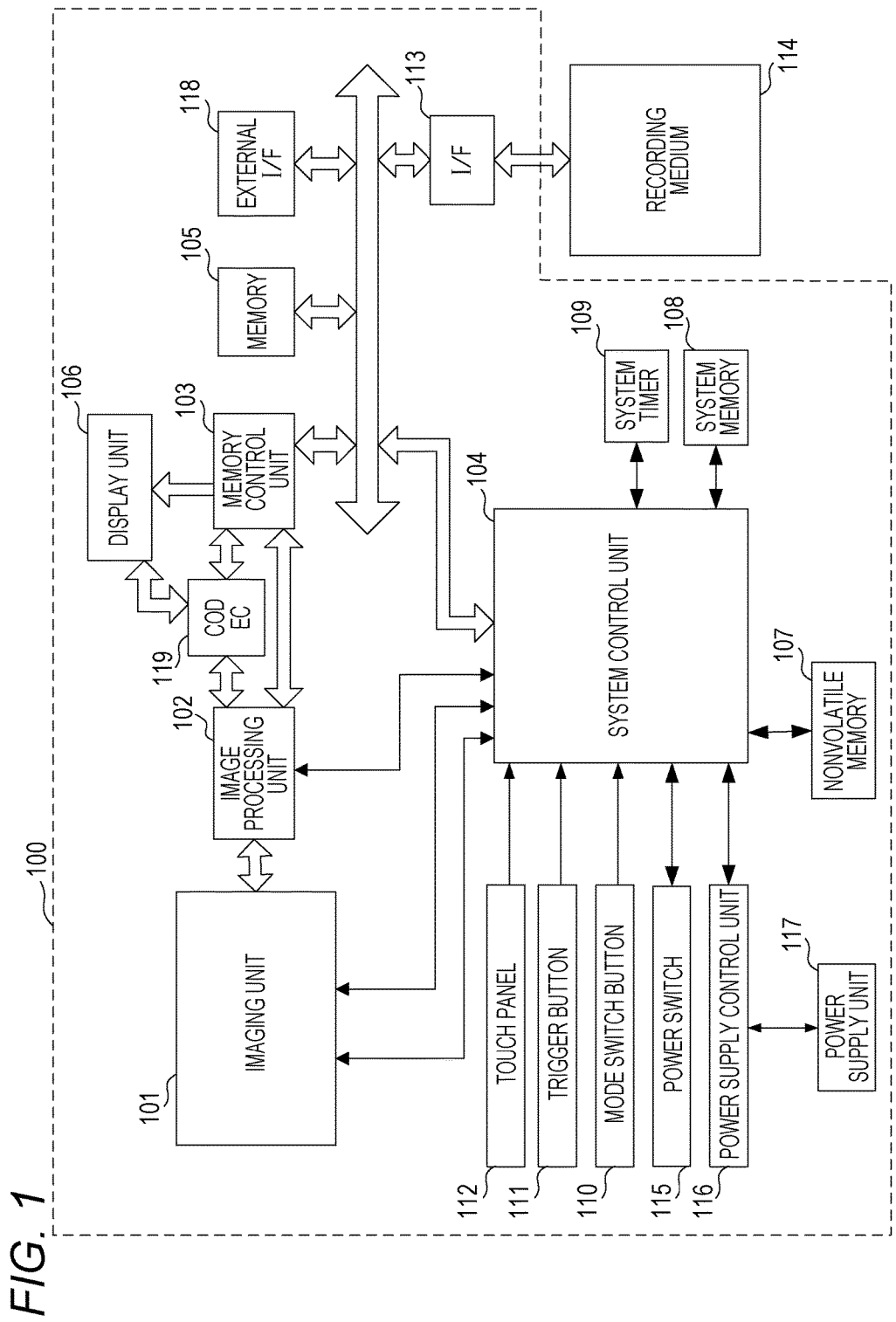
FIG. 1 is a block diagram illustrating a camera.

FIG. 1 is a block diagram illustrating a camera 100 according to a first exemplary embodiment. The camera 100 is a digital camera that can shoot a still image and a movie. An imaging unit 101 includes an imaging lens including a focusing lens, a diaphragm, a shutter unit, a charge-coupled device (CCD) or complementary metal-oxide semiconductor (CMOS) element for converting an optical image into an electrical signal, and an A/D converter for converting an analog signal into a digital signal.

An image processing unit 102 performs resizing processing such as predetermined pixel interpolation and reduction, and color conversion processing to data from the imaging unit 101 or data from a memory control unit 103. Furthermore, the image processing unit 102 applies an effect (a special effect) to such data. In addition, the image processing unit 102 performs predetermined calculation processing on image data obtained by image capturing. The obtained calculation result is transmitted to a system control unit 104, and the system control unit 104 performs exposure control and ranging control based on the calculation result. Automatic focus (AF) processing and automatic exposure (AE) processing are thereby performed. The image processing unit 102 performs the predetermined calculation processing using the image data obtained by image capturing. Automatic white balance (AWB) processing is performed based on the calculation result.

A coder decoder (CODEC) 119 performs encoding using a still image compression method such as the JPEG if image data from the image processing unit 102 is a still image, or using a movie compression method such as the MPEG2 and the H.264 if the image data is a movie. In addition, the CODEC 119 decodes encoded image data from the memory control unit 103. During the encoding, the CODEC 119 can also perform encoding in such a manner that an on-screen display (OSD) generated by a display unit 106 is superimposed on the image. Part of elements of an effect (a video effect) is implemented by the control of the CODEC 119. Output data from the imaging unit 101 is written into a memory 105 via the image processing unit 102, the CODEC 119, and the memory control unit 103.

The memory 105 stores image data obtained by the imaging unit 101 and encoded by the CODEC 119, and image data for display on the display unit 106. The memory 105 also functions as a frame buffer for the OSD and a work area for applying an effect to an image. The display unit 106 performs display according to image data for display that has been read out from the memory 105, on a display device such as an LCD. The display unit 106 is configured to display a still image with an aspect ratio of 4:3, and to display a movie with an aspect ratio of 16:9. By consecutively transferring image data accumulated in the memory 105 by the imaging unit 101, to the display unit 106 and displaying the image data thereon, the display unit 106 functions as an electronic viewfinder (a live view display). The display unit 106 also includes a function of displaying an OSD such as an icon and a time code that has been drawn on a bit map memory within the memory 105, superimposed on image data.

A nonvolatile memory 107 is an electrically-erasable and recordable memory. For example, an electrically erasable programmable read-only memory (EEPROM) or the like is used as the nonvolatile memory 107. Constants and programs for the operation of the system control unit 104, and the like are recorded on the nonvolatile memory 107. The programs refer to programs for executing below-described flowcharts in the respective exemplary embodiments.

The system control unit 104 controls the entire camera 100. The system control unit 104 includes, for example, a central processing unit (CPU). A random access memory (RAM) is used as a system memory 108. Constants and variables for the operation of the system control unit 104, programs read from the nonvolatile memory 107, and the like are loaded into the system memory 108. In addition, the system control unit 104 manages an operation of the image processing unit 102, and performs display control by controlling the memory 105, the display unit 106, etc. The system memory 108 and the memory 105 can be the same memory. The system control unit 104 implements below-described processing by loading the above-described program recorded on the nonvolatile memory 107, into the system memory 108, and executing the program.

A system timer 109 is a time measurement unit for measuring a time used for various types of control and a time of a built-in clock. A power switch 115, a mode switch button 110, a trigger button 111, and a touch panel 112 are operation units for inputting various operation instructions to the system control unit 104. The power switch 115 switches between power-on and power-off of the entire camera 100.

The mode switch button 110 generates a mode switching signal for switching an operation mode of the system control unit 104. According to the mode switching signal, the system control unit 104 switches the operation mode to any one of a recording mode, a reproduction mode, etc.

The trigger button 111 generates a trigger (release) signal for issuing a shooting instruction of a still image, and shooting start and end instructions of a movie to the system control unit 104. According to the trigger signal, the system control unit 104 starts or ends a series of operations of shooting processing. The shooting processing refers to processing of writing, into a recording medium 114, encoded image data accumulated in the memory 105 via the imaging unit 101, the image processing unit 102, the CODEC 119, and the memory control unit 103.

The touch panel 112 can detect a touch performed on the display unit 106. The touch panel 112 and the display unit 106 can be integrally formed. The system control unit 104 can detect the touch operations performed on the touch panel 112. A touch panel of any of the following various types of touch panels can be used as the touch panel 112: a resistive type, an electrostatic capacitance type, a surface acoustic wave type, an infrared light type, an electromagnetic induction type, an image recognition type, an optical sensor type, etc.

An external interface (I/F) 118 is an interface for connecting the apparatus to an external apparatus. For example, the I/F 118 is an I/F of a video input-output terminal such as composite video input-output and the High-Definition Multimedia Interface (HDMI®), a universal serial bus (USB), infrared communication, or wireless communication. By connecting a pointing device such as a mouse to the external I/F 118, the resultant unit can be treated as an input unit in place of the touch panel 112. In this case, the system control unit 104 displays a pointer on the display unit 106 in response to the input from the mouse connected to the external I/F 118. Furthermore, the system control unit 104 performs control equivalent to an operation performed via the touch panel 112, in response to the movement of the mouse or a click signal.

A power supply control unit 116 includes a battery detecting circuit, a DC-DC converter, a switch circuit for switching a block to be supplied with power, etc. The power supply control unit 116 detects the presence or absence of connection of a battery, the type of the battery, and a remaining battery capacity. In addition, based on the obtained detection results and an instruction from the system control unit 104, the power supply control unit 116 controls the DC-DC converter, and supplies power at necessary voltage to each unit including the recording medium 114, for a necessary time period. A power supply unit 117 includes a primary battery such as an alkali battery and a lithium battery, a secondary battery such as a nickel-cadmium (NiCd) battery, a nickel-metal hydride (NiMH) battery, and lithium (Li) battery, AC adapter, etc.

An I/F 113 is an interface with the recording medium 114 such as a memory card and a hard disc. The recording medium 114 is a recording medium such as a memory card, and includes a semiconductor memory, a magnetic disc, etc. The recording medium 114 records encoded image data stored in the memory 105, and accompanying metadata. In addition, data recorded on the recording medium 114 is read out by the I/F 113 and transferred to the memory 105. Recording of data onto the recording medium 114 is performed by the I/F 113. The recording medium 114 can be a memory card, a hard disc drive, a disc that attached to the camera 100, or a flash memory or a hard disc drive built into the camera 100. The recording medium 114 can include a plurality of the above-described devices, and can be configured to selectively use the devices.

Figure 2:
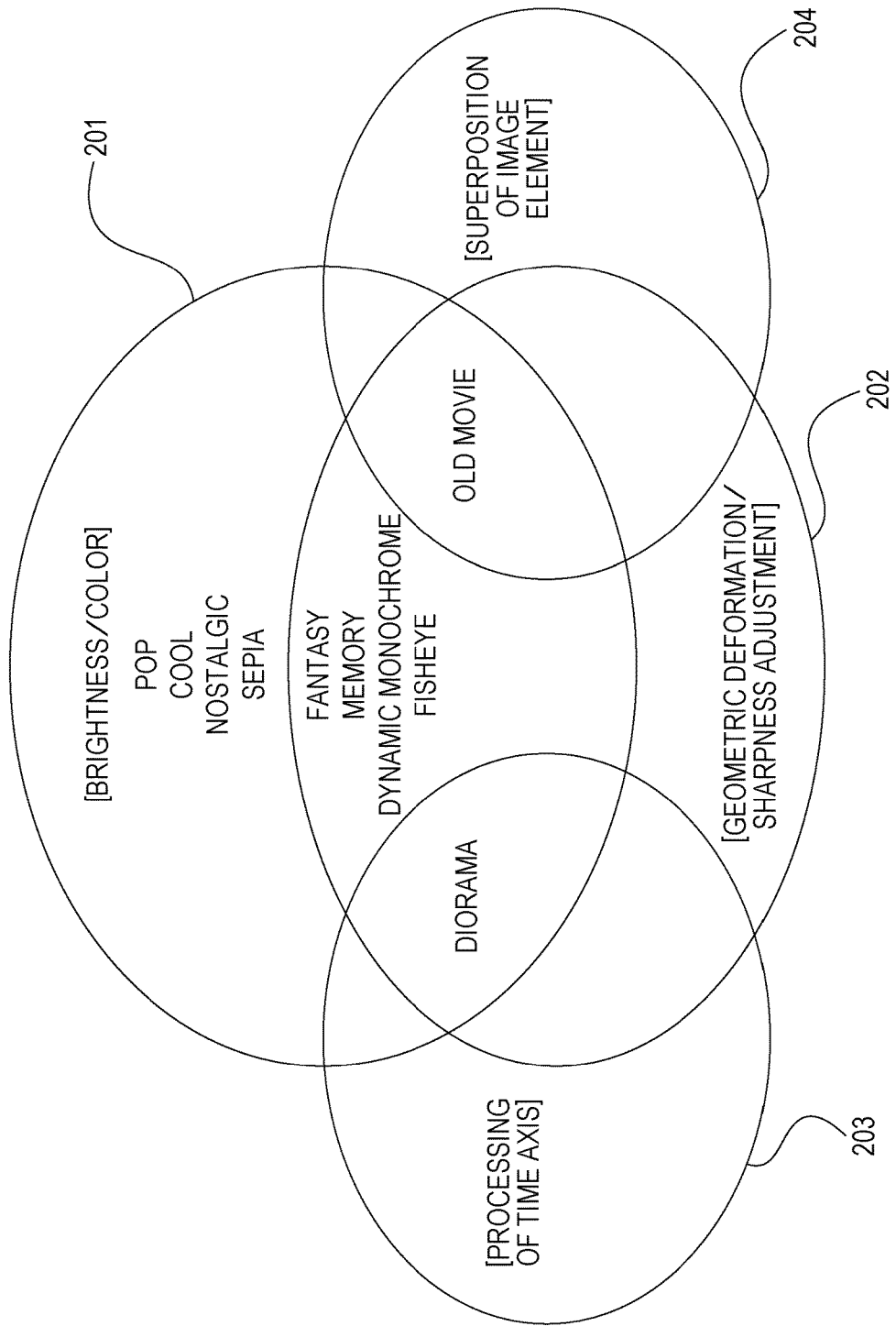
FIG. 2 is a diagram illustrating types of effects.

FIG. 2 is a diagram illustrating the types of effects that can be applied to an image by the image processing unit 102 of the camera 100. The effects can be represented by combinations of the following 4 elements:

Element for processing brightness and color (201)
Element for geometrically deforming an image and adjusting sharpness (blurring or sharpening) (202)
Element for changing a time axis of a movie (203)
Element for superimposing another image element (204)

Among these elements, 3 elements, i.e., elements 201, 202, and 204 can be implemented by the image processing unit 102, but control of the imaging unit 101 is also required depending on the element. Element 203 can be implemented by the CODEC 119 operating a frame rate of movie recording or reproduction. Interlace/progressive conversion needs to be simultaneously performed depending on the video type of the recording and reproduction. In this manner, the image processing unit 102, the imaging unit 101, and the CODEC 119 function as effect application units.

Identifiers (E+number) of the respective effects in the present exemplary embodiment, and the overviews of the technical effects thereof are indicated below:

E1/pop: increase color saturation.
E2/cool: set to a darkish color tone with low color temperature.
E3/nostalgic: decrease color saturation.
E4/sepia: set to a sepia color tone.
E5/fantasy: whiten and blur a bit a peripheral portion of an image.
E6/memory: blacken and blur a bit a peripheral portion of an image.
E7/dynamic monochrome: increase contrast and sharpness, and represent in monochrome.
E8/fisheye: distort the entire image in a barrel shape and represent as if the image is captured via a fisheye lens.
E9/diorama: increase color saturation and blur an image peripheral portion, and set a frame rate to ⅕ to 1/20 of a normal frame rate.
E10/old movie: superimpose black bars at the upper and lower parts of an image so as to make the image look like a landscape-oriented video, shake a screen like old films, and superimpose a defected image.

Among these effects, effects E1 to E4 are implemented by the processing of brightness/color (201). Effects E5 to E8 are implemented by the combination of the processing of brightness/color (201) and the geometric deformation/sharpness adjustment (202). Element E9 is implemented by the combination of three elements: the processing of brightness/color (201); the geometric deformation/sharpness adjustment (202); and the processing of the time axis (203). Element E10 is implemented by the combination of three elements: the processing of brightness/color (201); the geometric deformation/sharpness adjustment (202); and the superposition of the image element (204). Effects that can be applied by the camera 100 are not limited to the above-described effects.

In the duplicative application of effects, there are the combination of effects that bring about the respective technical effects of the two effects through the duplicative application, and the combination of effects that produces a result different from the technical effect expected by the user. Examples of the latter include a combination that provokes an image defect such as obvious deterioration in image quality.

For example, if the combination of the "E5/fantasy" and the "E1/pop" is applied, the combination can whitely blur the peripheral portion of an image to create fantastic mood, and can represent the image more impressively by increasing the overall color saturation. In contrast, for example, if the "E1/pop" and the "E3/nostalgic" are combined, their color saturation increasing and decreasing effects cancel each other out. This results in deterioration in gradation, besides less change in image. In addition, if the "E10/old movie" and the "E8/fisheye" are combined, black bar portions for making an image look like a landscape-oriented image are also distorted in a barrel shape. This causes a state different from an expected image.

Figure 3:
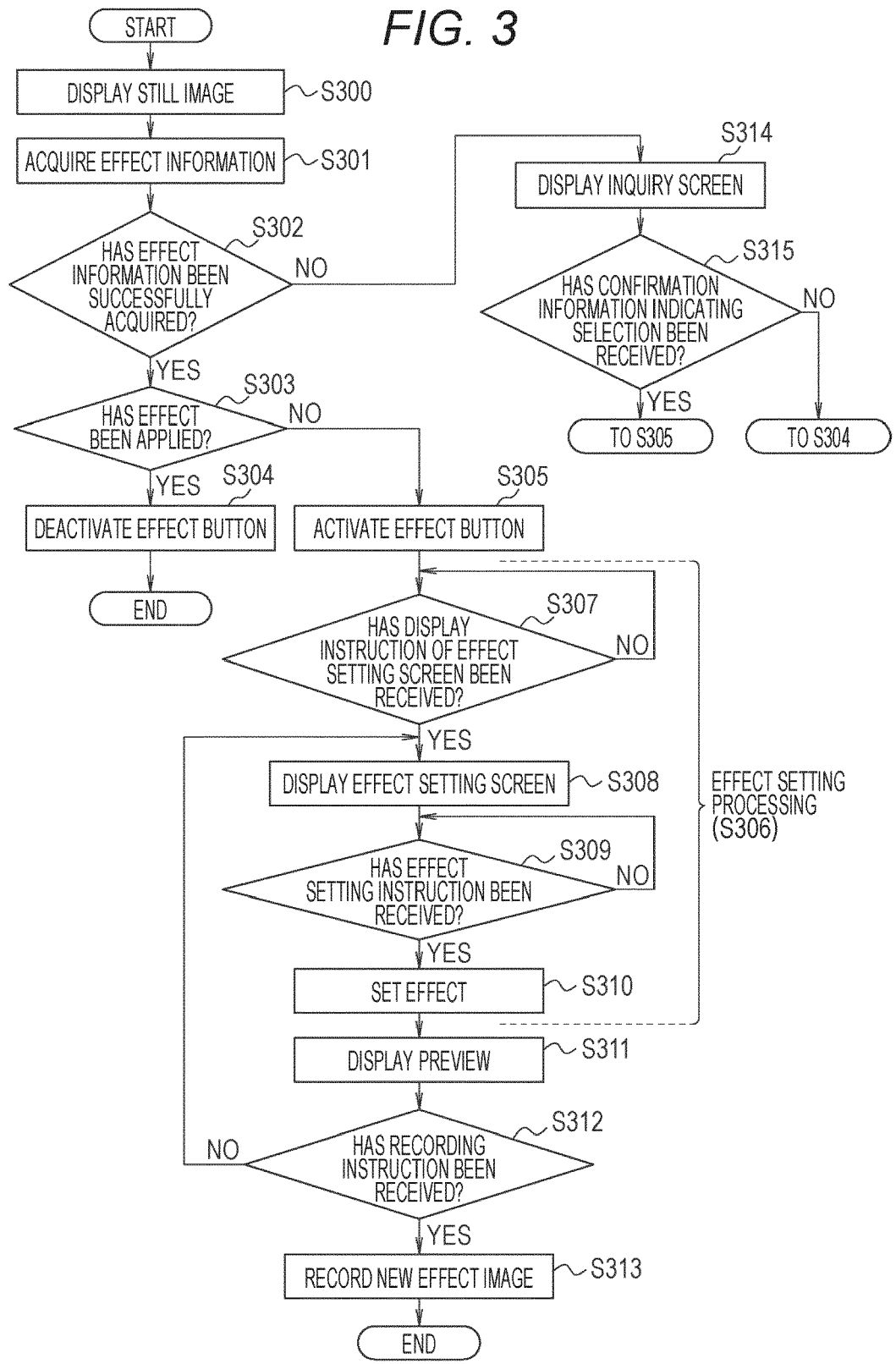
FIG. 3 is a flowchart illustrating effect processing.

The camera 100 according to the present exemplary embodiment can prevent a result not intended by the user from being obtained in such duplicative application of effects. The processing for achieving such a technical effect will be described below. FIG. 3 is a flowchart illustrating effect processing performed by the camera 100. The effect processing is processing executed after a still image is shot through shooting processing and recorded on the memory 105. As the premise of the effect processing, in some cases, the camera 100 applies an effect to a shot still image in the shooting processing, according to an instruction from the user or the like, for example. In such cases, the system control unit 104 is assumed to record information indicating that the effect has been applied and effect information indicating the type of the applied effect on the recording medium 114 in association with the effect-applied image as attribute information. Specifically, the system control unit 104 records the effect information as metadata in a file header of the image or another file (a management file) recorded in association with an image file. The system control unit 104 uses a method compliant with the Exchangeable image file format (Exif) for still images and the Advanced Video Codec High Definition (AVCHD) standard for movies, for example, as a recording method of metadata.

As another example, the system control unit 104 can record the effect information on the image itself. For still images, for example, an electronic watermark technology corresponds to this method. For movies, the effect information can be recorded on the image by embedding an identification signal into a blanking of a video signal. In this manner, in the case of recording the effect information on the image itself, there is no need to separately record data other than the image, as in the metadata method.

In yet another example, effect information including the time when the effect has been set can be recorded as shooting history information into the system memory 108. By using this method, the effect information can be recorded even in content in which metadata and an identification signal in image cannot be used. This method can only handle content recorded by the camera 100 itself, and can handle only a limited number of pieces of content that have been recorded last. In addition, the system memory 108 cannot hold content therein if the power is turned off. The system memory 108 is therefore configured to transfer data to the nonvolatile memory 107 or the recording medium 114 at an appropriate timing.

In S300, the system control unit 104 reads out a still image desired by the user from the recording medium 114 according to a user instruction, and displays a still image decoded by the CODEC 119 on the display unit 106. Next, in S301, the system control unit 104 acquires effect information of the still image being displayed. Specifically, the system control unit 104 reads out the effect information recorded on the recording medium 114 as metadata. In addition, as described above, if the effect information is recorded on the image itself, the system control unit 104 reads out the effect information through image signal analysis. If the effect information is recorded on the system memory 108, the system control unit 104 reads out the effect information from the system memory 108.

In S302, the system control unit 104 checks whether the effect information has been successfully acquired. If the effect information has been successfully acquired (YES in S302), the system control unit 104 advances the processing to S303. If the acquisition has failed (NO in S302), the system control unit 104 advances the processing to S314. In S303, the system control unit 104 determines, based on the acquired effect information, whether an effect has been applied to the still image (application determination processing). If an effect has been applied (YES in S303), the system control unit 104 advances the processing to S304. If no effect has been applied (NO in S303), the system control unit 104 advances the processing to S305.

In S304, the system control unit 104 deactivates an effect button and displays the effect button on the display unit 106, and then ends the effect processing for the still image being displayed. The effect button is an example of display items for the user selecting a new effect to be applied to the still image being displayed. As processing for deactivating the effect button, the system control unit 104 performs control so as to display the effect button in such a display manner that the user can identify the effect button as unselectable. In S304, the system control unit 104 further displays, on the display unit 106, an icon indicating the type of the already-applied effect. In this manner, by deactivating the effect button, the system control unit 104 can prohibit an application instruction of a new effect from being received from the user. In addition, if the user selects another still image, the system control unit 104 executes the effect processing again using the selected still image as a processing target. In addition, the processing in S304 is an example of display processing for displaying that an effect is deactivated.

On the other hand, in S305, the system control unit 104 activates the effect button and displays the effect button on the display unit 106. As processing for activating the effect button, the system control unit 104 performs control so as to display the effect button in such a display manner that the user can identify the effect button as selectable. The system control unit 104 further displays an icon indicating that no effect has been applied.

In this manner, by deactivating the effect button in S304, the system control unit 104 prohibits application instructions of all the new effects that can be executed by the effect application units, from being received from the user. On the other hand, by activating the effect button in S305, the system control unit 104 permits an application instruction of a new effect to be received from the user. In other words, the processing in S304 to S305 is an example of control processing for performing control so as to prohibit a new effect from being applied to the image if it is determined that an effect has been applied.

Figure 4A:
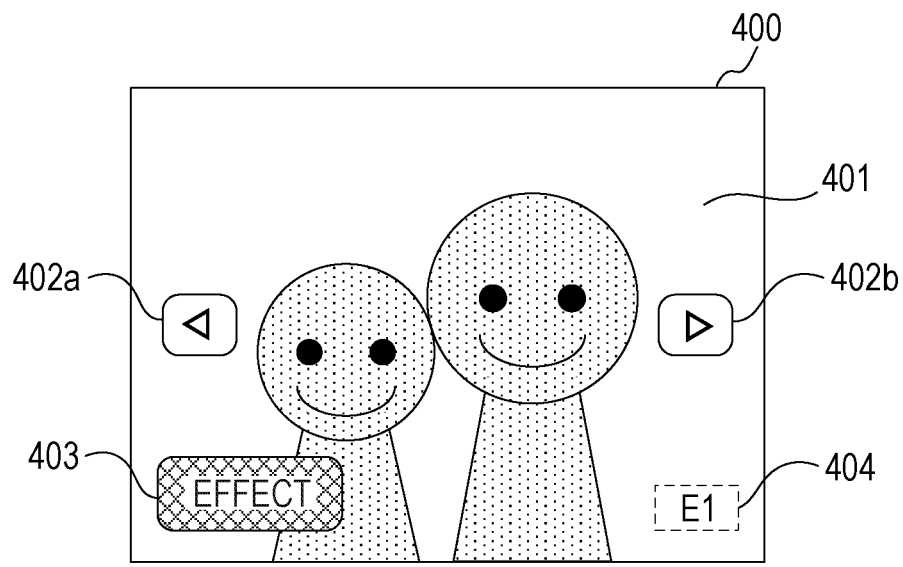
FIGS. 4A and 4B are diagrams each illustrating an example of a display screen.
Figure 4B:
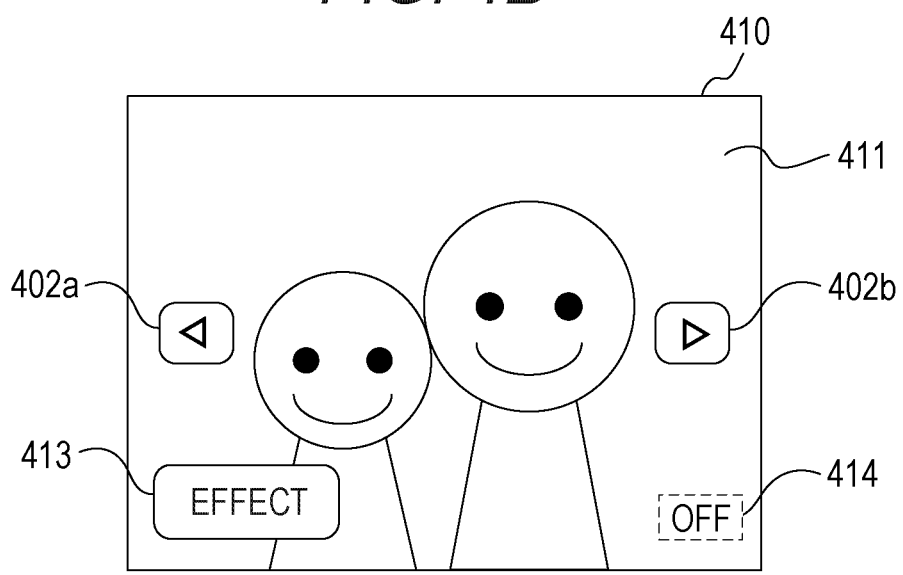

FIG. 4A is a diagram illustrating an example of a display screen 400 displayed in S304. FIG. 4B is a diagram illustrating an example of a display screen 410 displayed in S305. A still image 401 selected by the user is displayed on the display screen 400 illustrated in FIG. 4A. Here, the still image 401 is an image in a state in which an effect has been applied. Furthermore, buttons 402a and 402b for displaying the previous image and the next image are displayed with being superimposed on the still image 401. If a touch operation performed on the touch panel 112 that corresponds to the button 402a or 402b is detected, the system control unit 104 switches a still image to be displayed on the display unit 106, according to the touched button 402a or 402b.

In addition, if a touch operation performed on the button 402a or 402b is detected during the execution of the effect processing, the system control unit 104 ends the processing being executed, and performs the effect processing again from S300 using a still image related to the touch operation, as a display target. In addition, as another example, if a swipe operation (tracing with a finger) performed on an arbitrary region on the touch panel 112 is detected, the system control unit 104 can display a preceding or subsequent still image that corresponds to the swipe operation, on the display unit 106.

An effect button 403 is a button for displaying an effect setting screen. The effect button 403 on the display screen 400 is deactivated in S304. Thus, the user cannot select the effect button 403 by a touch operation or the like. Furthermore, an icon 404 indicating the type of an applied effect is also displayed on the display screen 400. The icon 404 illustrated in FIG. 4A indicates that the type of the applied effect is the "E1/pop".

A still image 411 selected by the user is displayed on the display screen 410 illustrated in FIG. 4B. Here, the still image 411 is an image in a state in which no effect has been applied. Furthermore, similarly to the display screen 400, the buttons 402a and 402b are displayed with being superimposed on the still image 411. An effect button 413 is a button for displaying an effect setting screen. The effect button 413 on the display screen 410 is activated in S305. Thus, the user can select the effect button 413 by a touch operation or the like. Furthermore, an icon 414 indicating that no effect has been applied is also displayed on the display screen 410.

In addition, the system control unit 104 displays the effect button 403 illustrated in FIG. 4A and the effect button 413 illustrated in FIG. 4B in such a display manner that the user can identify (distinguish between) the both buttons. More specifically, the system control unit 104 displays the effect button 413 illustrated in FIG. 4B, in such a normal display manner that the user can identify the effect button 413 as selectable, and displays the effect button 403 illustrated in FIG. 4A, in such a display manner that the user can identify the effect button 403 as unselectable. For example, the system control unit 104 can display the effect button 413 in color, and display a grayed-out effect button 413 as the effect button 403. Here, the effect buttons 403 and 413 each serve as an example of display items.

Referring back to FIG. 3, after the processing in S305, the system control unit 104 performs the effect setting processing (S306). The effect setting processing (S306) includes processing in S307 to S310 described below. In S307, the system control unit 104 stands by until a display instruction of the effect setting screen is received. If the system control unit 104 has received the display instruction (YES in S307), the system control unit 104 advances the processing to S308. In addition, if the user selects the effect button 413, the system control unit 104 receives the display instruction of the effect setting screen. In S308, the system control unit 104 displays the effect setting screen on the display unit 106.

Figure 5A:
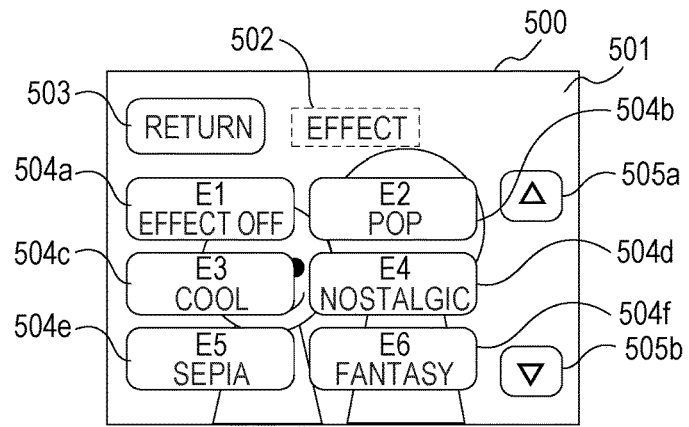
FIGS. 5A to 5C are diagrams each illustrating an example of a display screen.

FIG. 5A is a diagram illustrating an example of an effect setting screen 500. On the effect setting screen 500, a screen title 502, a return button 503, selection buttons 504a to 504f, and scroll buttons 505a and 505b are displayed superimposed on a shot image 501. An "effect" is displayed in the screen title 502 in FIG. 5A, so that the user can recognize that a screen has switched to the effect setting screen. The return button 503 is a button for returning to a previous display screen. The selection buttons 504a to 504f are buttons for selecting the types of effects to be newly applied.

The scroll buttons 505a and 505b are operation buttons for switching the types of effect selection buttons to be displayed. If the user selects any of the selection buttons 504a to 504f on the effect setting screen 500, the system control unit 104 receives a setting instruction of an effect of the type corresponding to the selected button of the selection buttons 504a to 504f.

Referring back to FIG. 3, after the processing in S308, the system control unit 104 advances the processing to S309. In S309, the system control unit 104 stands by until a setting instruction of an effect is received. If the system control unit 104 receives the setting instruction (YES in S309), the system control unit 104 advances the processing to S310. The processing in S309 is an example of reception processing for receiving an application instruction of a new effect. In S310, the system control unit 104 sets an effect related to the setting instruction to the still image. Specifically, the system control unit 104 records the type of the effect related to the setting instruction in the memory 105 in association with the still image. In addition, if the selection button 504a of effect off is selected, the system control unit 104 ends the effect processing. The system control unit 104 instructs the effect application units, including the image processing unit 102, to apply the effect related to the setting instruction. Next, in S311, the system control unit 104 preview-displays the effect-applied still image and displays a save dialog box.

Figure 5B:
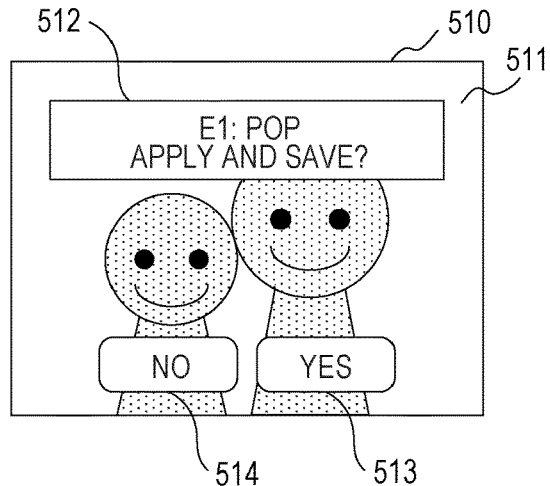

FIG. 5B is a diagram illustrating an example of a preview screen 510. A still image 511 to which the effect related to the setting instruction has been applied is displayed on the preview screen 510. For example, if the effect "E1/pop" is selected, a still image to which the "E1/pop" has been applied is displayed. Furthermore, a save dialog box 512, and confirmation buttons 513 and 514 are displayed with being superimposed on the still image 511. The save dialog box 512 is a message display for inquiring whether to apply an effect to the still image 511 and save the effect-applied still image 511. The button 513 is a button for instructing the application of the effect to the still image 511 and the saving of the effect-applied still image 511. The button 514 is a button for instructing the return of the screen to the previous screen without applying the effect.

Referring back to FIG. 3, after the processing in S311, in S312, the system control unit 104 checks whether a recording instruction has been received. If the button 513 is selected, the system control unit 104 determines that the recording instruction has been received (YES in S312), and advances the processing to S313. If the button 514 is selected, the system control unit 104 determines that a cancel instruction has been received, i.e., the recording instruction has not been received (NO in S312), and returns the processing to S308. In S313, the system control unit 104 encodes the preview-displayed new effect image using the CODEC 119, and then, records the image on the recording medium 114. Through the above-described processing, the effect processing ends.

Figure 5C:
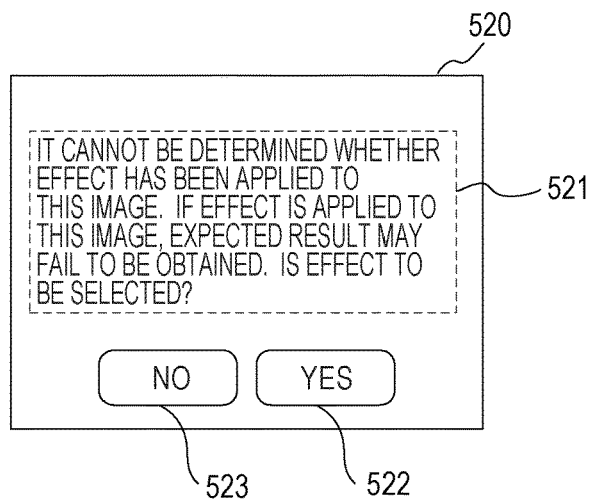

In addition, in S314, the system control unit 104 displays an inquiry screen. FIG. 5C is a diagram illustrating an example of an inquiry screen 520. A message 521 for prompting determination whether an effect is to be selected and selection buttons 522 and 523 are displayed on the inquiry screen 520. The selection button 522 is a button for instructing the selection of an effect. The selection button 523 is a button for instructing the non-selection of an effect. If the selection button 522 is selected, the system control unit 104 receives confirmation information indicating selection. If the selection button 523 is selected, the system control unit 104 receives confirmation information indicating non-selection.

Referring back to FIG. 3, after the processing in S314, in S315, if the system control unit 104 has received the confirmation information indicating selection (YES in S315), the system control unit 104 advances the processing to S305. If the system control unit 104 has received the confirmation information indicating non-selection (NO in S315), the system control unit 104 advances the processing to S304. The user can be thereby notified that a still image defect can occur if an effect is applied. In addition, whether to apply an effect can be controlled as desired by the user.

As another example, if the system control unit 104 has failed in the acquisition of the effect information (NO in S302), the system control unit 104 can advance the processing to S304. As still yet another example, if the system control unit 104 has failed in the acquisition (NO in S302), the system control unit 104 can advance the processing to S305.

As described above, the camera 100 according to the present exemplary embodiment can prevent a result different from user's intention from being obtained due to the duplicative application of effects to an image.

As a first modified example of the camera 100 according to the first exemplary embodiment, in S303, the camera 100 can activate the effect button and deactivate the selection button on the effect setting screen. In this case, the selection button is an example of a display item.

In addition, as a second modified example, the camera 100 can hide the effect button instead of deactivating the effect button. In the case of combining these two examples, the camera 100 can hide the selection button, and, in S304, the effect button is displayed. The camera 100 can execute the above-described processing using a combination of a plurality of different examples in this manner.

In addition, as a third modified example, processing of controlling prohibition or permission of effect application by the camera 100 is not limited to the processing described in the exemplary embodiment. For example, the camera 100 can perform the following processing instead of deactivating or activating the effect button. If it is determined that an effect has been applied (YES in S303), the system control unit 104 prohibits the effect application unit from applying a new effect. If it is determined that no effect has been applied (NO in S303), the system control unit 104 permits the effect application unit to apply a new effect.

If it is determined that an effect has been applied, the camera 100 can prohibit the effect application unit from applying an effect only for an application-prohibited type. The application-prohibited type refers to a type of an effect predefined for each effect as a type of an effect of which duplicative application is prohibited. For example, as described above, if the "E1/pop" and the "E3/nostalgic" are combined, their color saturation increasing and decreasing effects cancel each other out. This results in an image defect such as deterioration in gradation, besides less change in image. In this case, the camera 100 pre-stores the "E3/nostalgic" as an application-prohibited type for the "E1/pop". In a similar manner, the camera 100 stores, into a storage unit, the "E1/pop" as an application-prohibited type for the "E3/nostalgic".

Figure 6:
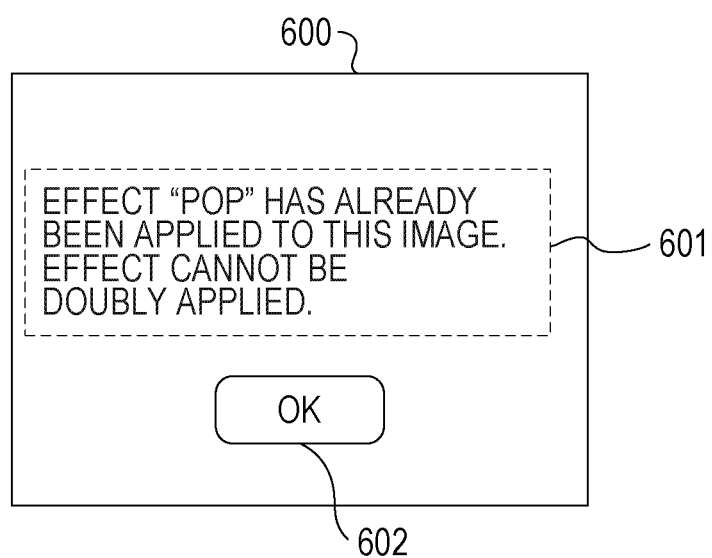
FIG. 6 is a diagram illustrating an example of a display screen.

In addition, as a fourth modified example, if it is determined that an effect has been applied (YES in S303), the camera 100 can perform the following processing. If the effect button is selected and a setting instruction of an effect has been received, the camera 100 can display a message indicating that the effect cannot be applied instead of deactivating the effect button. Specifically, the camera 100 displays a warning screen 600 illustrated in FIG. 6. A message 601 and a confirmation button 602 are displayed on the warning screen 600. The message 601 is information for notifying the user that multiple applications of effects cannot be performed. In other words, the message 601 indicates that effect application is restricted. The confirmation button 602 is a button for closing the warning screen 600 and for returning a screen state to a screen state caused before the effect button is pressed. The user can thus easily understand that the effect cannot be applied.

In addition, as a fifth modified example the system control unit 104, based on an applied effect, can identify a type of an application-prohibited effect, and deactivate only the selection button of the effect of the identified type. For example, the camera 100 stores a type of an applied effect and a type of an application-prohibited effect in the nonvolatile memory 107 in association with each other. The type of the application-prohibited effect is such a type of an effect that, if the effect is doubly applied in addition to the applied effect, an image defect occurs, leading to a result not intended by the user. More specifically, the camera 100 pre-stores, in the nonvolatile memory 107, correspondence information indicating, for each of a plurality of effects, an effect that can be newly applied to an image to which a corresponding effect has been applied, or an effect that cannot be newly applied thereto. The plurality of effects includes at least an effect that can be applied by the image processing unit 102. Then, the system control unit 104 refers to the correspondence information stored in the nonvolatile memory 107, and identifies the type of the application-prohibited effect that is associated with the applied effect.

By combining the fifth modified example with the first modified example, the camera 100 can deactivate only the selection button of the type of the application-prohibited effect from among the selection buttons, and can activate the remaining selection buttons. The user can thereby use effects with less restriction. For example, the correspondence information stores, as duplicative application prohibited combinations, newly applying the E1/pop again to an image to which the E1/pop effect of emphasizing the color saturation of the image (effect of increasing color saturation) has been applied, and applying the diorama (effect of increasing color saturation) thereto. This is because, if these effects are doubly applied, color information is saturated, and a resultant image becomes too-sharply-outlined and awkward. In addition, the correspondence information stores, as a duplicative application prohibited combination, newly applying the E3/nostalgic (effect of decreasing color saturation) to the image to which the E1/pop (effect of increasing color saturation) has been applied.

If these effects are doubly applied, their color saturation increasing and decreasing effects cancel each other out, and this results in deterioration in gradation, besides less change in image. In addition, the correspondence information stores, as a duplicative application prohibited combination, newly applying the E8/fisheye (image distorting effect) to an image to which the E10/old movie (effect of adding letter boxes (black bars) so as to make the image look like a landscape-oriented image) has been applied. This is because a resultant image is distorted including the letter boxes. The inverse combinations of these combinations are also prohibited. In contrast, the correspondence information stores, as a duplicative application permitted combination, newly combining the E1/pop (effect of increasing color saturation) with an image to which the E5/fantasy (effect of whitening and blurring a peripheral portion of an image) has been applied. This combination can whitely blur the peripheral portion of the image to create fantastic mood, and represent the image more impressively by increasing the overall color saturation. The inverse combination thereof is also permitted.

As a sixth modified example, the camera 100 can be a digital still camera for shooting a still image.

As a seventh modified example, also in the case of using a movie as a display target in place of a still image, the camera 100 can prohibit the application of a new effect to an effect-applied movie, as described in the first exemplary embodiment. In this case, the camera 100 can be a digital video camera for shooting a movie.

Second Exemplary Embodiment

A camera 100 according to a second exemplary embodiment will now be described. In movie reproduction, the camera 100 according to the second exemplary embodiment presets an effect to be applied to a reproduction target movie, and continuously reproduces a series of movie scenes. The camera 100 according to the present exemplary embodiment pre-stores, into a storage unit, an effect of an application-prohibited type and an alternative effect of each effect in association with each other. The alternative effect refers to an effect prepared on the assumption that the effect is applied in combination with an applied effect, and an effect for obtaining a result having both of the two effects as expected by the user.

For example, if the "E10/old movie" and the "E8/fisheye" are combined, an image defect occurs as described above. In view of this, an effect of applying an image distorting effect to a limited screen region excluding black bar portions added by the "E10/old movie" of an image to which the "E10/old movie" has been applied is associated as an alternative effect of the "E8/fisheye". The combination of the "E10/old movie" and the alternative effect of the "E8/fisheye" can avoid distorting the black bar portions in a barrel shape, and can represent the image in such a manner that both of the two effects are achieved.

Besides such an alternative effect, considerable alternative effects include an effect with a changed degree of processing of brightness or color and an effect with part of partial elements being omitted. For example, the duplicative application of the "E1/pop" and the "E1/pop" is expected to saturate the color saturation of an image. In view of this, by applying an alternative effect with suppressed color saturation emphasis as the second effect, such a problem can be avoided. In addition, if the "E3/nostalgic" and the "E9/diorama" are combined, their color saturation increasing and decreasing effects conflict with each other. Thus, an alternative effect obtained by omitting a color saturation adjustment element from the "E9/diorama" to apply only blurring and frame rate control elements is used.

Figure 7:
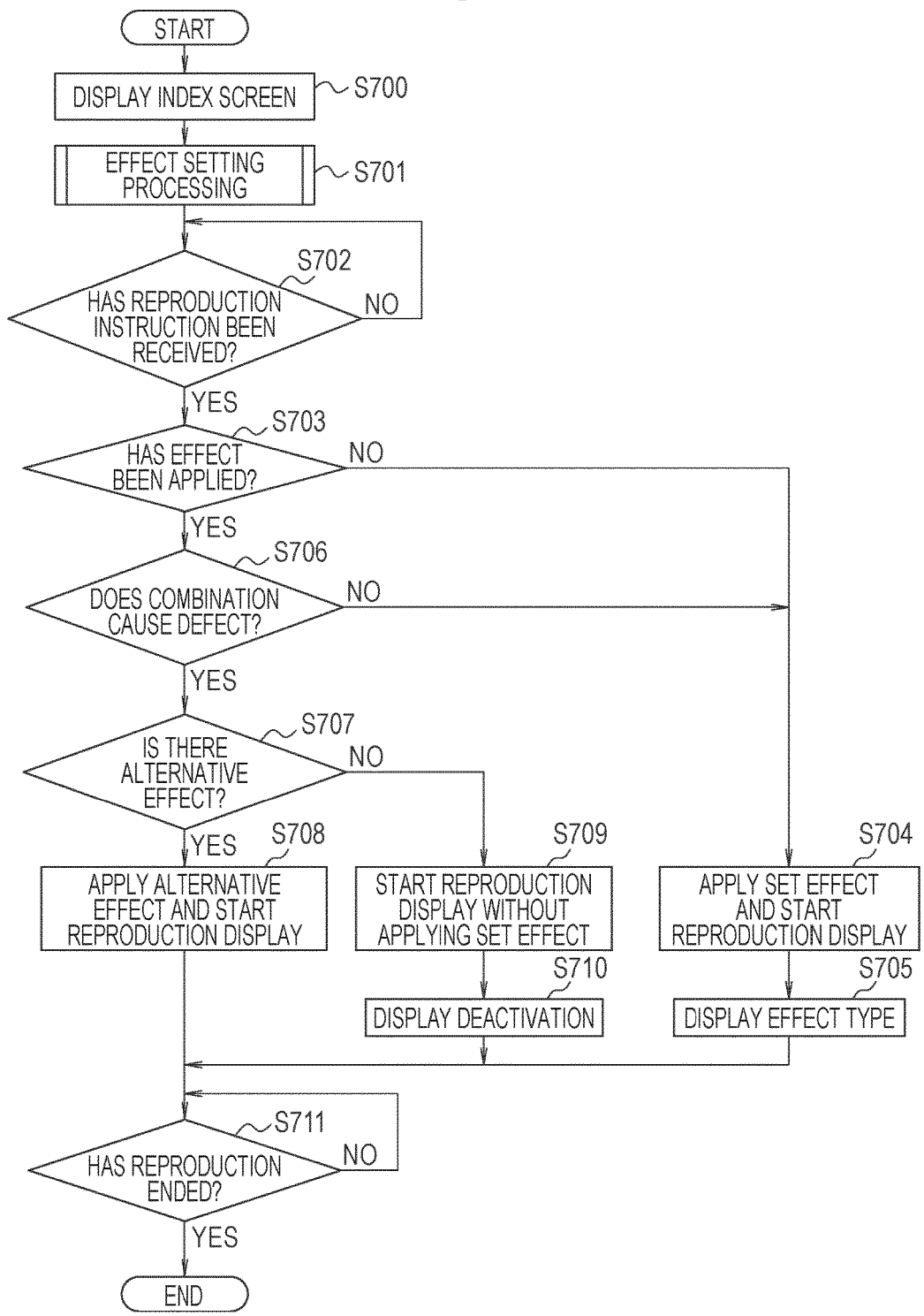
FIG. 7 is a flowchart illustrating effect processing according to a second exemplary embodiment.
Figure 8A:
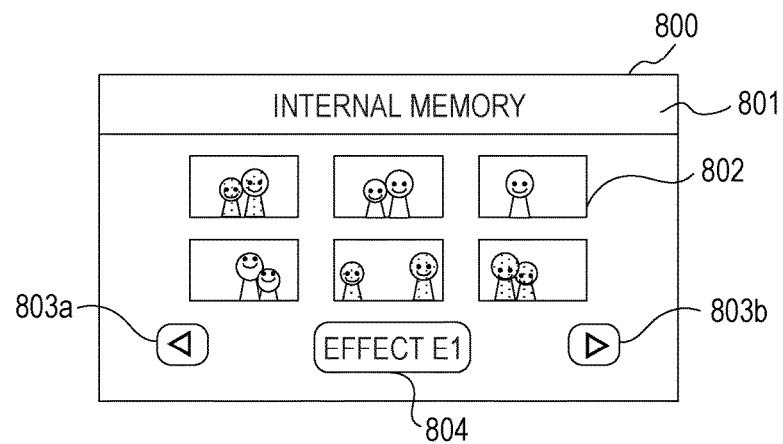
FIGS. 8A to 8C are diagrams each illustrating an example of a display screen.

FIG. 7 is a flowchart illustrating effect processing according to the second exemplary embodiment. In S700, the system control unit 104 displays an index screen for selecting a movie scene to be reproduced, on the display unit 106. FIG. 8A is a diagram illustrating an example of an index screen 800. A title display 801 indicates that an image is content in an internal memory equivalent to the recording medium 114. A group of thumbnails 802 indicate movie scenes in the recording medium 114. If an arbitrary thumbnail is touched, the camera 100 can start continuous reproduction of a movie starting from the touched movie scene.

Buttons 803a and 803b are buttons for switching the group of thumbnails 802 to the previous page and the next page, respectively. An effect button 804 is a button for transitioning to a setting screen of an effect to be applied in movie reproduction, and the current setting status "E1" is displayed within the button.

Referring back to FIG. 7, after the processing in S700, in S701, the system control unit 104 performs effect setting processing. The processing performed in the effect setting processing (S701) is similar to the effect setting processing (S306) described with reference to FIG. 3. In the present exemplary embodiment, a movie is used as a target of an effect in place of a still image. In addition, if the effect button 804 on the index screen 800 is selected, the system control unit 104 receives a display instruction of an effect setting screen.

Next, in S702, the system control unit 104 stands by until a reproduction instruction is received. If the system control unit 104 receives the reproduction instruction (YES in S702), the system control unit 104 advances the processing to S703. If one thumbnail of the group of thumbnails 802 on the index screen 800 is touched, the system control unit 104 receives a reproduction instruction of a movie scene corresponding to the touched thumbnail. In S703, the system control unit 104 checks whether an effect has been applied based on effect information of the movie related to the reproduction instruction. If an effect has been applied (YES in S703), the system control unit 104 advances the processing to S706. If no effect has been applied (NO in S703), the system control unit 104 advances the processing to S704.

Figure 8B:
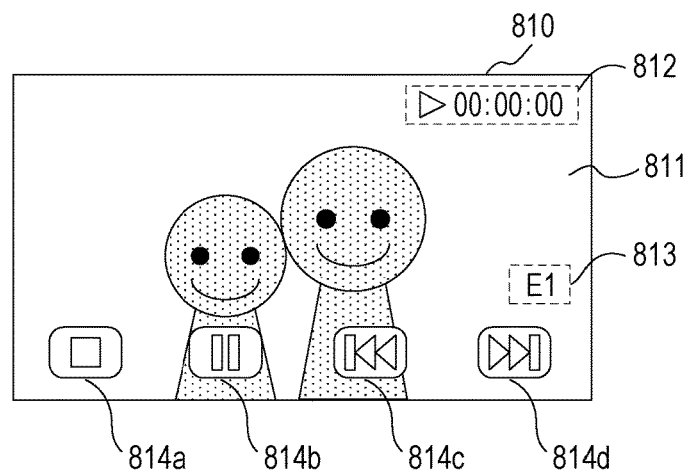

In 3704, the system control unit 104 applies the effect set in S701, and starts the reproduction of the movie from a reproduction target movie scene. Next, in S705, the system control unit 104 displays the type of the applied effect on the display unit 106. FIG. 8B is a diagram illustrating an example of a reproduction screen 810 displayed in S705. A movie 811 is a movie being reproduced. The effect "E1/pop" is applied to the movie 811. An icon indicating that a scene is being reproduced and a time code display indicating a reproduction position in the scene are denoted by 812. An icon 813 indicates the type of the effect being applied. In addition, if no effect has been set in S701, the icon 813 is not displayed. Buttons 814a to 814d are buttons for issuing instructions to a reproduction operation of the scene that is performed by the CODEC 119. The buttons 814a to 814d are a reproduction stop button, a reproduction pause button, a reverse scene skip button, and a forward scene skip button in this order.

Referring back to FIG. 7, after S705, the system control unit 104 advances the processing to S711. In S711, the system control unit 104 continues the reproduction until the end of the movie (NO in S710). If the reproduction ends (YES in S711), the effect processing ends.

In S706, the system control unit 104 identifies the type of the applied effect based on the effect information of the movie related to the reproduction instruction. Then, the system control unit 104 refers to the storage unit and determines whether the combination of the type of the applied effect and the type of the effect set in the effect setting processing (S701) causes an image defect (defect determination processing). If the type of the effect set in the effect setting processing is associated in the storage unit with the applied effect as an application-prohibited type, the system control unit 104 determines that an image defect occurs. If the system control unit 104 determines that an image defect occurs (YES in S706), the system control unit 104 advances the processing to S707. If the system control unit 104 determines that an image defect does not occur (NO in S706), the system control unit 104 advances the processing to S704.

In S707, the system control unit 104 checks whether an alternative effect corresponding to the effect set in the effect setting processing (S701) is stored in the storage unit. If there is an alternative effect (YES in S707), the system control unit 104 advances the processing to S708. If there is no alternative effect (NO in S707), the system control unit 104 advances the processing to S709. In S708, the system control unit 104 applies the alternative effect in place of the effect set in the effect setting processing (S701), and starts the reproduction of the movie from the reproduction target movie scene. Then, the system control unit 104 advances the processing to S711.

In S709, the system control unit 104 starts the reproduction of the movie from the reproduction target movie scene without applying the effect set in the effect setting processing (S701), i.e., without applying any effect. Next, in S710, the system control unit 104 displays, on the display unit 106, an icon indicating that the effect set in the effect setting processing (S701) is deactivated, and then, advances the processing to S711.

Figure 8C:
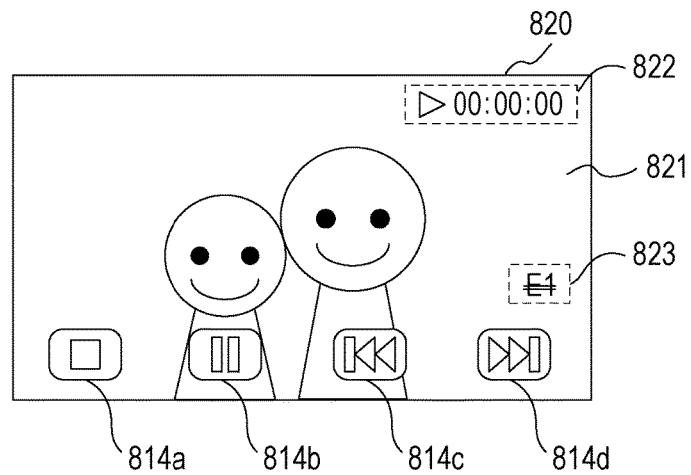

FIG. 8C is a diagram illustrating an example of a reproduction screen 820 displayed in S710. A movie 821 is a movie being reproduced. No effect is applied to the movie 821. For indicating such a state, a double line indicating that an effect is not applied is superimposed on an icon 823 indicating the type of an effect being applied. Except for the foregoing, the configuration of the reproduction screen 820 is similar to the reproduction screen 810 illustrated in FIG. 8B. In addition, except for the foregoing, the configuration and the processing of the camera 100 according to the second exemplary embodiment are similar to the configuration and the processing of the camera 100 according to the first exemplary embodiment.

As described above, even in the case of performing continuous reproduction of a series of movie scenes, the camera 100 according to the second exemplary embodiment can avoid an image defect caused by duplicative application of an effect to an effect-applied scene. By using an alternative effect that does not cause an image defect, the camera 100 can obtain such a result that effects are combined. In this manner, the camera 100 according to the present exemplary embodiment can represent a video with the intention(s) of the user being heeded as much as possible, while avoiding an image defect.

As a modified example of the second exemplary embodiment, the camera 100 can execute the effect processing described with reference to FIG. 7, also in the reproduction of a slide show of a series of still images, in addition to movies.

Third Exemplary Embodiment

A camera 100 according to a third exemplary embodiment will now be described. The camera 100 according to the third exemplary embodiment is a digital camera including a scenario mode. The scenario mode is a function enabling one of a plurality of scenario themes prepared in the camera 100 in advance to be selected, and the sequential shooting and continuous reproduction of scenes to be performed according to a series of scene titles in the selected theme. The user can thereby shoot and reproduce a well-organized video work without regard to editing. The following description describes processing where the camera 100 performs shooting and reproduction by combining effect functions in the scenario mode.

Figure 9:
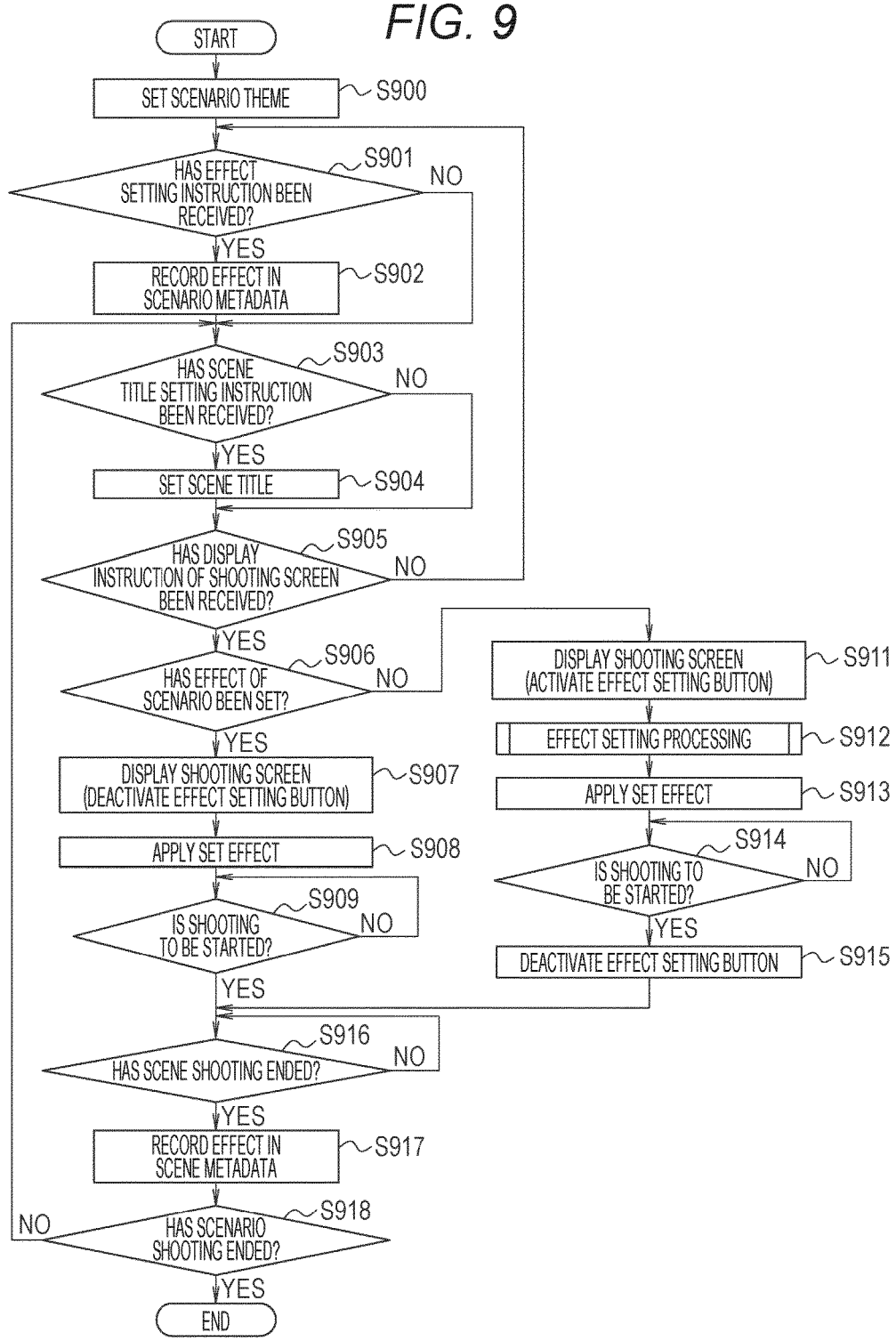
FIG. 9 is a flowchart illustrating scenario shooting processing.

FIG. 9 is a flowchart illustrating scenario shooting processing according to the third exemplary embodiment. When an operation mode is set to a shooting mode in the scenario mode, the system control unit 104 starts the scenario shooting processing. In S900, the system control unit 104 sets a scenario theme according to a user operation. In addition, the setting of the scenario theme is performed according to a user operation performed on a setting screen of a scenario theme (not illustrated). If the system control unit 104 newly creates a scenario, the system control unit 104 creates a container of scenario metadata in the recording medium 114. The scenario metadata is data recording information about a series of scenes in the created scenario, a reproduction order, information about a theme title, information about an effect to be applied, etc. The system control unit 104 further displays a shooting confirmation screen.

Figure 10A:
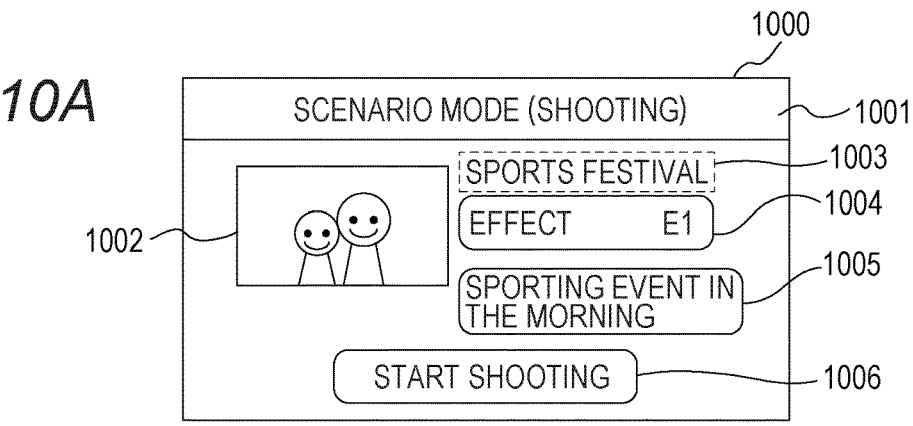
FIGS. 10A to 10C are diagrams each illustrating an example of a display screen.

FIG. 10A is a diagram illustrating an example of a shooting confirmation screen 1000. A title display 1001 indicates that the displayed screen is a shooting confirmation screen in the scenario mode. A thumbnail 1002 is displayed on the shooting confirmation screen 1000. If scene shooting is being performed for the scenario theme set in S900, a thumbnail of the scene is displayed. If nothing has been shot for this scenario theme, a sample thumbnail representing a feature of the set scenario theme is displayed. A character string 1003 is a title character string of the scenario theme set in S900. A button 1004 is a button for transitioning to a setting screen of an effect to be applied to a series of scenes to be shot in this scenario theme, and the current setting status "E1" is displayed within the button. A button 1005 is a button for transitioning to a selection screen of a scene to be shot in this scenario theme, and a scene title "sporting event in the morning" that is set at the display time point is displayed within the button. A button 1006 is a button for transitioning from the shooting confirmation screen to a shooting screen.

Referring back to FIG. 9, after the processing in S900, the system control unit 104 advances the processing to S901. In S901, the system control unit 104 checks whether a setting instruction of an effect has been received on the shooting confirmation screen. In addition, if the button 1004 is selected on the shooting confirmation screen according to a user operation, an effect setting screen is displayed, and a selection button of an effect is selected on the effect setting screen, the system control unit 104 receives the setting instruction. In addition, the effect setting screen displayed at this time is similar to the effect setting screen described with reference to FIG. 5A. If the system control unit 104 has received a setting instruction of an effect (YES in S901), the system control unit 104 advances the processing to S902. If the system control unit 104 has not received a setting instruction of an effect, or has received a setting instruction "off" indicating that no effect is to be set (NO in S901), the system control unit 104 advances the processing to S903.

In S902, the system control unit 104 records the type of an effect to be applied to a series of scenes to be shot in the scenario theme set in S900, in the scenario metadata created in S900. Next, in S903, the system control unit 104 checks whether a setting instruction of a scene title has been received. If the selection button 1005 of a scene title is selected on the shooting confirmation screen, the system control unit 104 displays a setting screen of a scene title (not illustrated). Then, if a scene title is selected on the setting screen of a scene title according to a user operation, the system control unit 104 receives a setting instruction of a scene title. If the system control unit 104 has received a setting instruction of a scene title (YES in S903), the system control unit 104 advances the processing to S904. If the system control unit 104 has not received a setting instruction of a scene title (NO in S903), the system control unit 104 advances the processing to S905.

In S904, the system control unit 104 sets a scene title according to the setting instruction. Next, in S905, the system control unit 104 determines whether a display instruction of the shooting screen has been received in response to a user operation being performed on the button 1006 indicating "start shooting". If the system control unit 104 has received the display instruction (YES in S905), the system control unit 104 advances the processing to S906. If the system control unit 104 has not received the display instruction (NO in S905), the system control unit 104 returns the processing to S901.

In S906, the system control unit 104 determines whether an effect has been set in the scenario metadata in S902. If an effect has been set (YES in S906), the system control unit 104 advances the processing to S907. If no effect has been set (NO in S906), the system control unit 104 advances the processing to S911. In S907, the system control unit 104 displays the shooting screen. At this time, the system control unit 104 deactivates an effect setting button on the shooting screen.

Figure 10B:
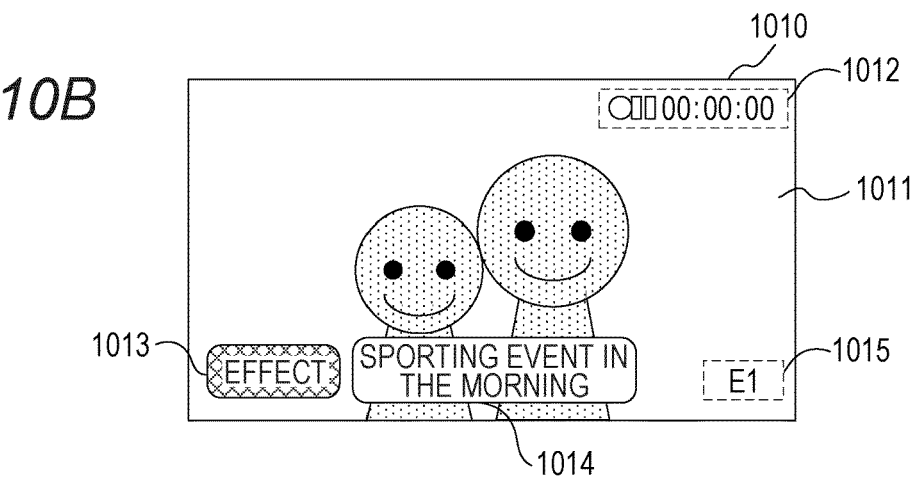

FIG. 10B is a diagram illustrating an example of a shooting screen 1010 displayed in S907. A shot image 1011 is displayed on the shooting screen 1010. The shot image 1011 is an image in a state in which the effect "E1/pop" has been applied. An icon indicating a shooting operating state and a time code indicating a shooting time are denoted by 1012. In FIG. 10B, a standby state before the shooting start is displayed. A button 1013 is a button for transitioning to an effect setting screen for individually setting an effect for each scene to be shot. Since the effect "E1" is applied to the entire scenario on the shooting screen 1010 in FIG. 10B, the display of the button 1013 is deactivated. A button 1014 is a button for transitioning to a scene title setting screen (not illustrated) of a scene to be shot, and a setting status "sporting event in the morning" at the display time point is displayed. An icon 1015 indicates the type of an effect applied to the entire scenario. In this example, the setting status "E1" at the display time point is displayed.

Referring back to FIG. 9, after the processing in S907, the system control unit 104 advances the processing to S908. In S908, the system control unit 104 applies the effect set in S902, to a scene. Next, in S909, the system control unit 104 checks whether a shooting start instruction has been received. If the system control unit 104 has received the shooting instruction (YES in S909), the system control unit 104 starts shooting. Next, in S916, the system control unit 104 continues the shooting until the shooting of the scene is ended by the trigger button 111. If the shooting has ended (YES in S916), the system control unit 104 advances the processing to S917. In S917, the system control unit 104 records shooting information including information about the type of the effect applied in S908, in metadata of the shot scene. Next, if the system control unit 104 determines in S918 that the scenario shooting has ended (YES in S918), the system control unit 104 ends the scenario shooting processing. If the system control unit 104 determines that the scenario shooting has not ended (NO in S918), the system control unit 104 returns the processing to S903.

Figure 10C:
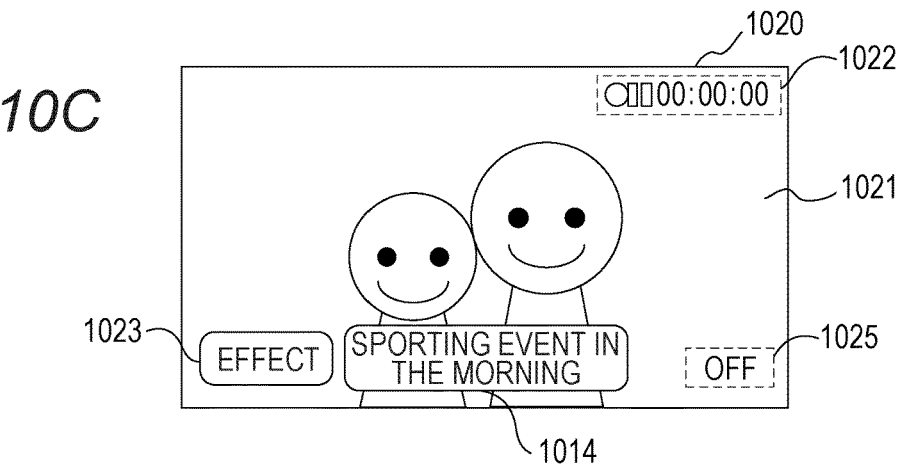

In S911, the system control unit 104 displays the shooting screen. At this time, the system control unit 104 activates the effect setting button on the shooting screen. FIG. 10C is a diagram illustrating an example of a shooting screen 1020 displayed in S911. A shot image 1021 is displayed on the shooting screen 1020. The shot image 1021 is an image in a state in which no effect has been applied. An effect button 1023 is a button for transitioning to the effect setting screen for individually setting an effect for each scene to be shot. In S911, since an effect of the entire scenario is set to off, the button 1023 is displayed in an activated state, so that an effect can be selected for each scene. An icon 1025 indicates the type of an effect applied to the entire scenario. In this example, a setting status "OFF" at the display time point is displayed. Except for the foregoing, the configuration of the shooting screen 1020 is similar to the shooting screen 1010 illustrated in FIG. 10B.

Referring back to FIG. 9, after the processing in S911, the system control unit 104 advances the processing to S912. In S912, the system control unit 104 performs effect setting processing. The processing performed in the effect setting processing (S912) is similar to the effect setting processing (S306) described with reference to FIG. 3. In the present exemplary embodiment, a scene is used as a target of an effect. In addition, if the effect button 1023 on the shooting screen 1020 is selected, the system control unit 104 receives a display instruction of the effect setting screen.

Next, in S913, the system control unit 104 applies the effect set in S912 to the scene. Then, in S914, the system control unit 104 checks whether a shooting start instruction has been received. If the system control unit 104 has received the shooting instruction (YES in S914), the system control unit 104 starts shooting. Next, in S915, the system control unit 104 deactivates the effect button 1023, and then advances the processing to S916. In this manner, since the effect button 1023 is deactivated in S915, the effect cannot be changed during the shooting.

Figure 11:
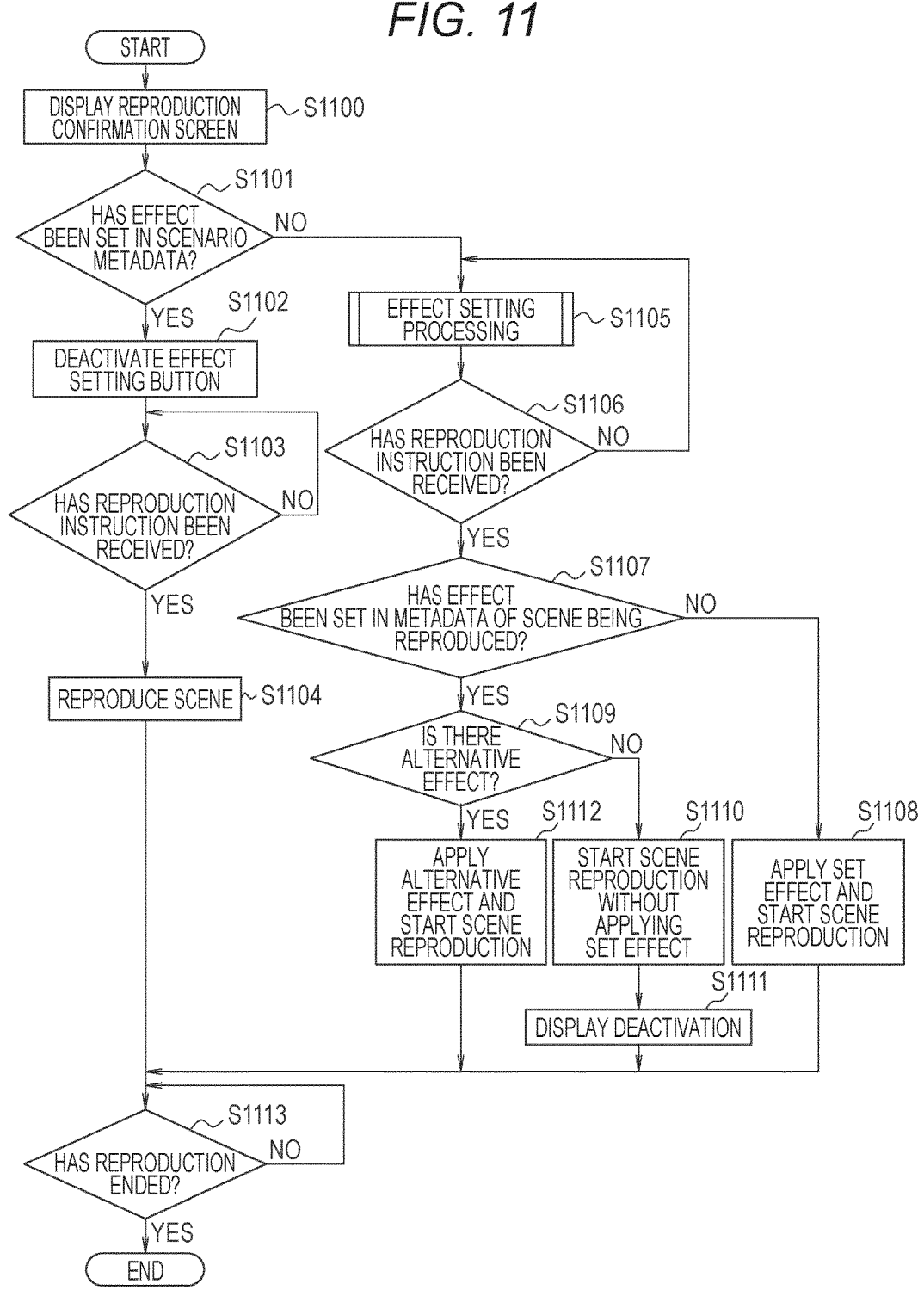
FIG. 11 is a flowchart illustrating scenario reproduction processing.

Next, scenario reproduction processing will be described. FIG. 11 is a flowchart illustrating the scenario reproduction processing. When an operation mode is set to a reproduction mode in the scenario mode, the system control unit 104 starts the scenario reproduction processing. In S1100, if a reproduction target scenario is selected on a scenario selection screen (not illustrated) according to a user operation, the system control unit 104 reads out scenario metadata from the recording medium 114, and displays a reproduction confirmation screen.

Figure 12:
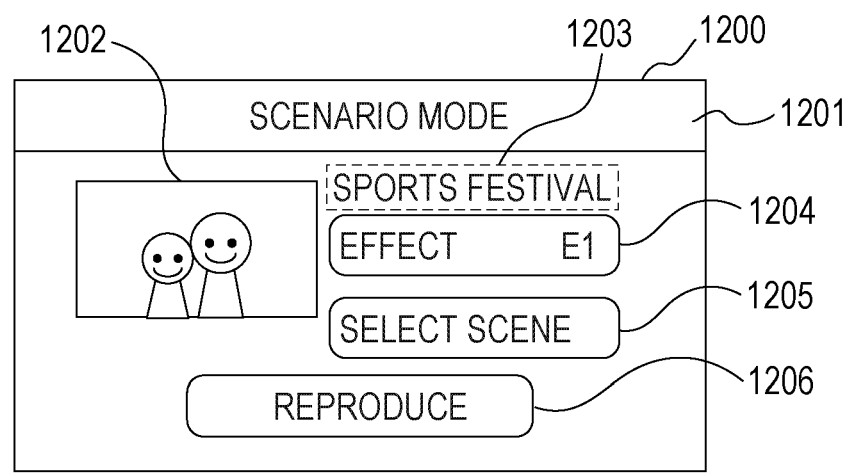
FIG. 12 is a diagram illustrating an example of a display screen.

FIG. 12 is a diagram illustrating an example of a reproduction confirmation screen 1200 displayed in S1100. A title display 1201 indicates that the displayed screen is a reproduction confirmation screen in the scenario mode. A thumbnail 1202 is a thumbnail of a scene in the scenario selected by the user. A character string 1203 is a theme title character string of the scenario selected by the user, and is displayed based on information in scenario metadata. An effect button 1204 is a button for transitioning to a selection screen of an effect to be newly applied in the reproduction of this scenario, and the setting status "E1" at the display time point is displayed within the button. A button 1205 is a button for transitioning to a scene selection screen for starting reproduction from an arbitrary scene in the scenario. A button 1206 is a button for transitioning to a reproduction screen, and for starting the reproduction of a series of scenes of the scenario.

Referring back to FIG. 11, after the processing in S1100, the system control unit 104 advances the processing to S1101. In S1101, the system control unit 104 determines whether an effect has been set in scenario metadata of the scenario selected in S1100, i.e., determines whether an effect has been set to the entire scenario during the scenario shooting. If an effect has been set (YES in S1101), the system control unit 104 advances the processing to S1102. If no effect has been set (NO in S1101), the system control unit 104 advances the processing to S1105.

In S1102, the system control unit 104 deactivates the effect button 1204. More specifically, if the system control unit 104 has applied the effect to the entire scenario during the shooting, in the processing in S1102, the system control unit 104 prohibits the multiple application of effects during the reproduction for preserving the original video. Next, in S1103, the system control unit 104 stands by until a reproduction instruction is received in response to the button 1206 indicating "reproduce" being selected according to a user operation. If the system control unit 104 has received the reproduction instruction (YES in S1103), the system control unit 104 advances the processing to S1104. In S1104, the system control unit 104 displays the reproduction screen, and starts scene reproduction. Next, in S1113, the system control unit 104 continues the reproduction until the reproduction ends. If the reproduction ends (YES in S1113), the system control unit 104 ends the scenario reproduction processing.

Figure 13A:
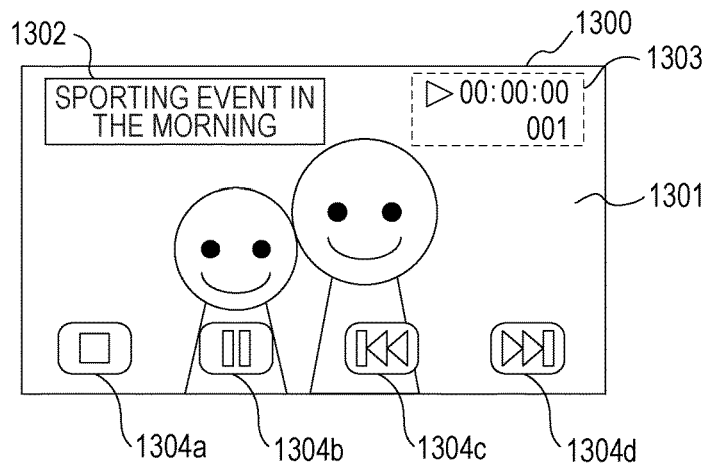
FIGS. 13A to 13C are diagrams each illustrating an example of a display screen.

FIG. 13A is a diagram illustrating an example of a reproduction screen 1300 displayed in S1104. A movie 1301 is a movie being reproduced. The movie 1301 is a movie in a state in which only an effect applied during the shooting is reflected and a new effect has not been applied. A character string 1302 is a character string indicating a scene title of the scene being reproduced. An icon indicating that the scene is being reproduced, a time code indicating a reproduction position in the scene, and a scene number in the scenario are denoted by 1303. Buttons 1304a to 1304d are buttons for issuing instructions to a reproduction operation of the scene that is performed by the CODEC 119. The buttons 1304a to 1304d are a reproduction stop button, a reproduction pause button, a reverse scene skip button, and a forward scene skip button in this order. An icon indicating effect application is not displayed on the reproduction screen 1300.

Referring back to FIG. 11, in S1105, the system control unit 104 performs effect setting processing. The processing performed in the effect setting processing (S1105) is similar to the effect setting processing (S306) described with reference to FIG. 3. In the present exemplary embodiment, a scene is used as a target of an effect. In addition, if the effect button 1204 on the reproduction confirmation screen 1200 is selected, the system control unit 104 receives a display instruction of the effect setting screen.

Next, in S1106, the system control unit 104 checks whether a reproduction instruction has been received in response to the button 1206 indicating "reproduce" being selected according to a user operation. If the system control unit 104 has received the reproduction instruction (YES in S1106), the system control unit 104 advances the processing to S1107. If the system control unit 104 has not received the reproduction instruction (NO in S1106), the system control unit 104 returns the processing to S1105. In S1107, the system control unit 104 determines whether an effect has been set in scene metadata of the scene being reproduced. If an effect has been set (YES in S1107), the system control unit 104 advances the processing to S1109. If no effect has been set (NO in S1107), the system control unit 104 advances the processing to S1108. In S1108, the system control unit 104 applies the effect set in S1105 and starts scene reproduction, and then advances the processing to S1113.

Figure 13B:
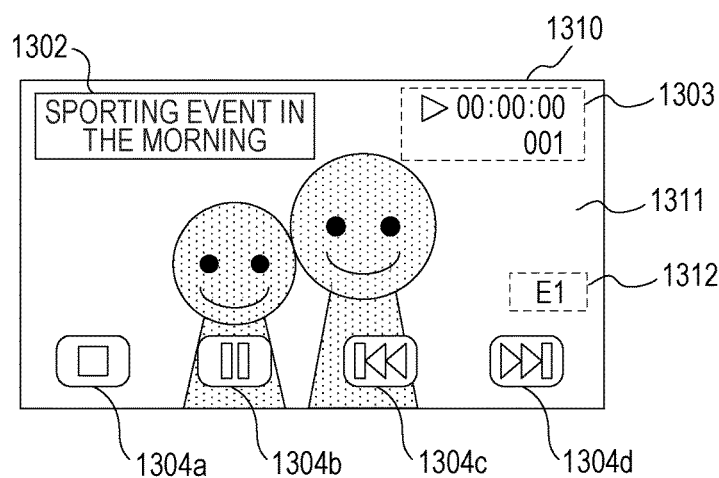

FIG. 13B is a diagram illustrating an example of a reproduction screen 1310 displayed in S1108. A movie 1311 is a movie being reproduced. The movie 1311 is a movie in a state in which the effect set in S1105 has been applied. An icon 1312 indicates that the effect is applied to the scene being reproduced. In addition, if no effect has been set in S1105, this icon 1312 is not displayed. Except for the foregoing, the configuration of the reproduction screen 1310 is similar to the reproduction screen 1300 illustrated in FIG. 13A.

Referring back to FIG. 11, in S1109, the system control unit 104 checks whether there is an alternative effect that can be applied in addition to the effect set in the scene metadata, instead of applying the effect set in S1105. If there is an alternative effect (YES in S1109), the system control unit 104 advances the processing to S1112. If there is no alternative effect (NO in S1109), the system control unit 104 advances the processing to S1110. In S1110, the system control unit 104 starts scene reproduction without applying the effect set in S1105. Next, in S1111, the system control unit 104 displays, on the display unit 106, an icon indicating that the effect set in the effect setting processing (S1105) is deactivated, and then, advances the processing to S1113.

Figure 13C:
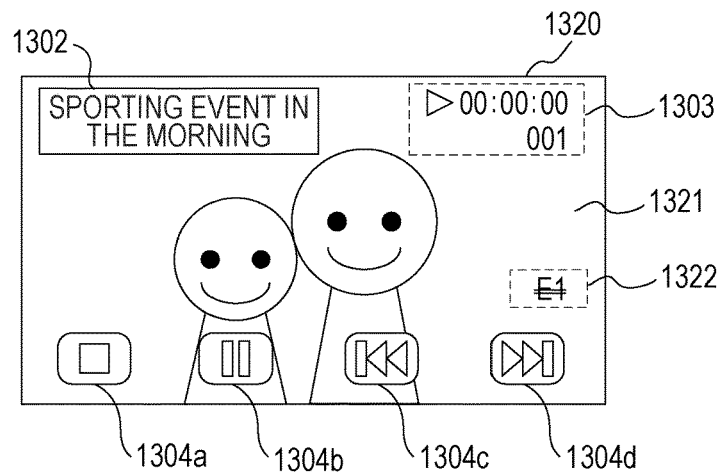

FIG. 13C is a diagram illustrating an example of a reproduction screen 1320 displayed on the display unit 106 after the processing in S1111. A movie 1321 is a movie being reproduced. The movie 1321 is a movie to which only the effect set in the scene metadata during the shooting has been applied, and in which the effect set in S1105 is not reflected. An icon 1322 indicates that the effect set in S1105 is not applied to the scene being reproduced. If no effect has been set in S1105, this icon 1322 is not displayed. Except for the foregoing, the configuration of the reproduction screen 1320 is similar to the reproduction screen 1300 illustrated in FIG. 13A.

Referring back to FIG. 11, in S1112, the system control unit 104 applies the alternative effect and starts scene reproduction, and then, advances the processing to S1113. The reproduction screen displayed in S1112 is similar to the reproduction screen 1300 illustrated in FIG. 13A. Except for the foregoing, the configuration and the processing of the camera 100 according to the third exemplary embodiment are similar to the configuration and the processing of the camera 100 according to the other exemplary embodiments.

As described above, the camera 100 according to the present exemplary embodiment includes the scenario mode, and can avoid an image defect caused by the multiple application of effects to an effect-applied scene, even in the case where shooting and reproduction are performed after effect setting has been performed. The flexibility for arranging an image by applying an effect during the reproduction can be ensured while preserving an original effect set during the scenario shooting.

According to each of the above-described exemplary embodiments, a result different from a user's intention can be prevented due to the duplicative application of effects to an image.

The control of the system control unit 104 can be performed by a single hardware component. Alternatively, the entire apparatus can be controlled by a plurality of hardware components sharing the functions of the system control unit 104.

The present invention has been described in detail based on the preferred exemplary embodiments thereof. Aspects of the present invention, however, are not limited to these specific exemplary embodiments. Various forms not departing from the scope of the aspects of the present invention are applicable. Furthermore, each of the above-described exemplary embodiments merely indicates an exemplary embodiment of the present invention, and the exemplary embodiments can be appropriately combined.

The above-described examples have described exemplary embodiments being applied to a camera. The aspects of the present invention are not limited to these examples. Aspects of the present invention are applicable to any information processing apparatus that controls the application of an effect to an image. More specifically, aspects of the present invention are applicable to a personal computer, a personal digital assistance (PDA), a mobile phone terminal, a mobile image viewer, a printer apparatus including a display, a digital photo frame, a music player, a game machine, an electronic book reader, etc.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-182991, filed Sep. 16, 2015, which is hereby incorporated by reference herein in its entirety.

What is claimed is:

1. An information processing apparatus comprising:
at least one processor; and
a memory coupled to the at least one processor, the memory having instructions that, when executed by the processor, perform operations as:
a readout unit configured to read out information recorded in association with an image that indicates an effect applied to the image;
a processing unit configured to apply an effect to an image; and
a control unit configured to, in a case where the information indicating the effect applied to the image has been read out, perform control to restrict the processing unit from applying to the image a part of effects including an effect other than the applied effect and being set according to the applied effect indicated by the information, from among a plurality of effects that can be applied, wherein, in a case where the applied effect indicated by the information is a first effect, the control unit performs control to restrict the processing unit from applying a second effect corresponding to the first effect to the image, and to enable the processing unit to apply an alternative effect identified based on the first effect and the second effect, and wherein, in a case where the readout unit reads out, as information associated with the image, information indicating that the first effect of adding a black bar to an image is applied, the control unit performs control so that, from among the plurality of effects, the second effect of distorting the entire image cannot be applied to the image, and performs control so that an effect of applying an image distorting effect to a limited screen region excluding a black bar portion added by the first effect is applied as an alternative effect of the second effect.

2. The information processing apparatus according to claim 1, further comprising a storage unit configured to store correspondence information indicating, for each of the plurality of effects, an effect not restricted from being additionally applied to an image to which a corresponding effect has been applied or an effect restricted from being additionally applied, wherein the control unit identifies the part of effects based on the correspondence information.

3. The information processing apparatus according to claim 1, wherein, in a case where the restriction is performed, the control unit performs control so that the part of effects cannot be applied to the image.

4. The information processing apparatus according to claim 1, wherein, in a case where the restriction is performed, in a case where an instruction for applying the part of effects is issued, the control unit performs control to display a confirmation screen for confirming whether to apply the effect, and in a case where the instruction for applying the effect is issued after the confirmation screen is displayed, the control unit controls the processing unit to apply the effect.

5. The information processing apparatus according to claim 1, wherein, in a case where the restriction is performed, the control unit performs control to display, from among display items for selecting an effect to be applied to an image, a display item indicating the part of effects in an identifiable display manner or to hide the display item indicating the part of effects.

6. The information processing apparatus according to claim 1, wherein, in a case where the applied effect indicated by the information read out by the readout unit is an effect of adding a black bar to an image, the control unit performs control so that, from among the plurality of effects, an image distorting effect cannot be applied to the image associated with the information.

7. The information processing apparatus according to claim 1, wherein, in a case where the applied effect indicated by the information read out by the readout unit is an effect of increasing color saturation of an image, the control unit performs control so that, from among the plurality of effects, at least either one of the effect of increasing color saturation or an effect of decreasing color saturation cannot be applied to the image associated with the information.

8. The information processing apparatus according to claim 1, wherein, in a case where the applied effect indicated by the information read out by the readout unit is an effect of whitening and blurring a peripheral portion of an image, the control unit performs control so as to permit, from among the plurality of effects, an effect of increasing color saturation to be applied to the image associated with the information.

9. The information processing apparatus according to claim 1, wherein, from among the plurality of effects, the processing unit applies an effect selected by a user to an image.

10. The information processing apparatus according to claim 1, wherein all effects that are applied by the processing unit are effects applied by image processing.

11. The information processing apparatus according to claim 1, wherein the effect includes at least one of brightness adjustment of an image, geometric deformation, a change of sharpness, or superposition of another image.

12. The information processing apparatus according to claim 11, wherein in the case of a movie, the effect includes changing a time axis of the movie.

13. The information processing apparatus according to claim 1, wherein the memory having instructions that, when executed by the processor, further performs operations as:
a display processing unit configured to, in a case where the control unit restricts application of a new effect, display that an effect is restricted.

14. The information processing apparatus according to claim 1, wherein the memory having instructions that, when executed by the processor, further performs operations as:
an imaging sensor; and
a recording control unit configured to record an image captured by the imaging sensor on a recording medium, wherein the processing unit applies an effect to an image captured by the imaging sensor, and
wherein the recording control unit performs control to record an image captured by the imaging sensor and to which an effect has been applied by the processing unit, on the recording medium, and to record information indicating the effect applied by the processing unit in association with the image.

15. A method for controlling an information processing apparatus, the method comprising:
a readout step of reading out information recorded in association with an image and that indicates an effect applied to the image;
a processing step of applying an effect to an image; and
a control step of, in a case where the information indicating the effect applied to the image has been read out, performing control to restrict the processing step from applying to the image a part of effects including an effect other than the applied effect and being set according to the applied effect indicated by the information, from among a plurality of effects that can be applied,
wherein, in a case where the applied effect indicated by the information is a first effect, the control step performs control to restrict the processing step from applying a second effect corresponding to the first effect to the image, and to enable the processing step to apply an alternative effect identified based on the first effect and the second effect, and
wherein, in a case where the readout step reads out, as information associated with the image, information indicating that the first effect of adding a black bar to an image is applied, the control step performs control so that, from among the plurality of effects, the second effect of distorting the entire image cannot be applied to the image, and performs control so that an effect of applying an image distorting effect to a limited screen region excluding a black bar portion added by the first effect is applied as an alternative effect of the second effect.

16. A non-transitory computer-readable storage medium storing computer executable steps for causing a computer to execute a method, the method comprising:

reading out information recorded in association with an image and that indicates an effect applied to the image;

applying an effect to an image; and performing control to, in a case where the information indicating the effect applied to the image has been read out, restrict applying to the image a part of effects including an effect other than the applied effect and being set according to the applied effect indicated by the information, from among a plurality of effects that can be applied, wherein, in a case where the applied effect indicated by the information is a first effect, the performing control performs control to restrict the processing step from applying a second effect corresponding to the first effect to the image, and to enable the processing step to apply an alternative effect identified based on the first effect and the second effect, and wherein, in a case where the reading out reads out, as information associated with the image, information indicating that the first effect of adding a black bar to an image is applied, the performing performs control so that, from among the plurality of effects, the second effect of distorting the entire image cannot be applied to the image, and performs control so that an effect of applying an image distorting effect to a limited screen region excluding a black bar portion added by the first effect is applied as an alternative effect of the second effect.

17. The method according to claim 15, further comprising a storing step for storing correspondence information indicating, for each of the plurality of effects, an effect not restricted from being additionally applied to an image to which a corresponding effect has been applied or an effect restricted from being additionally applied, wherein the control step identifies the part of effects based on the correspondence information.

18. The method according to claim 15, wherein, in a case where the restriction is performed, the controlling step performs control so that the part of effects cannot be applied to the image.

19. The non-transitory computer-readable storage medium according to claim 16, further comprising storing correspondence information indicating, for each of the plurality of effects, an effect not restricted from being additionally applied to an image to which a corresponding effect has been applied or an effect restricted from being additionally applied, wherein the performing control identifies the part of effects based on the correspondence information.

20. The non-transitory computer-readable storage medium according to claim 16, wherein, in a case where the restriction is performed, the performing control performs control so that the part of effects cannot be applied to the image.

* * * * *